Dec. 29, 1964  W. D. McCOURTY ETAL  3,163,116
PUMPS
Filed Aug. 23, 1961  5 Sheets-Sheet 4
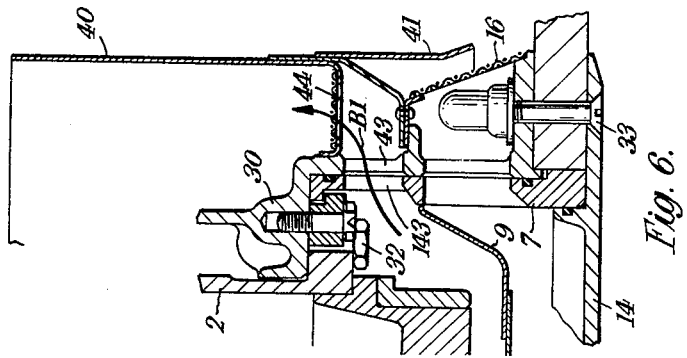
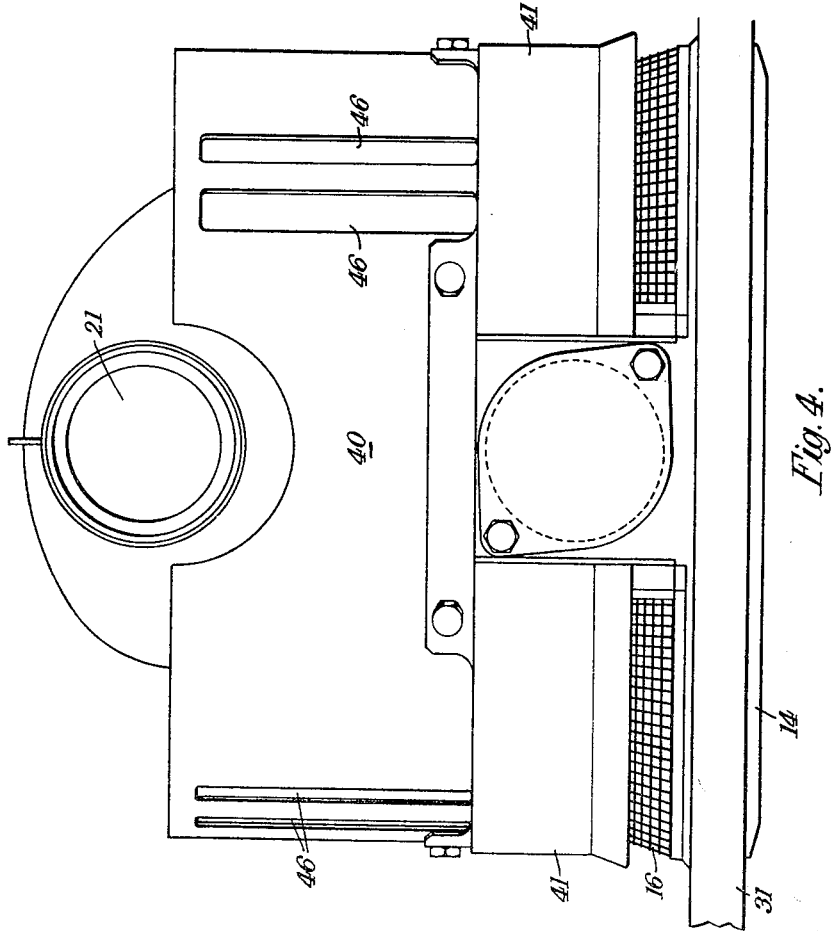
INVENTORS
WILLIAM DONALD McCOURTY
ERIC WILLIAMS
IVOR BYRON CRIPPS
By Moses, Nolte & Nolte ET AL
ATTORNEYS

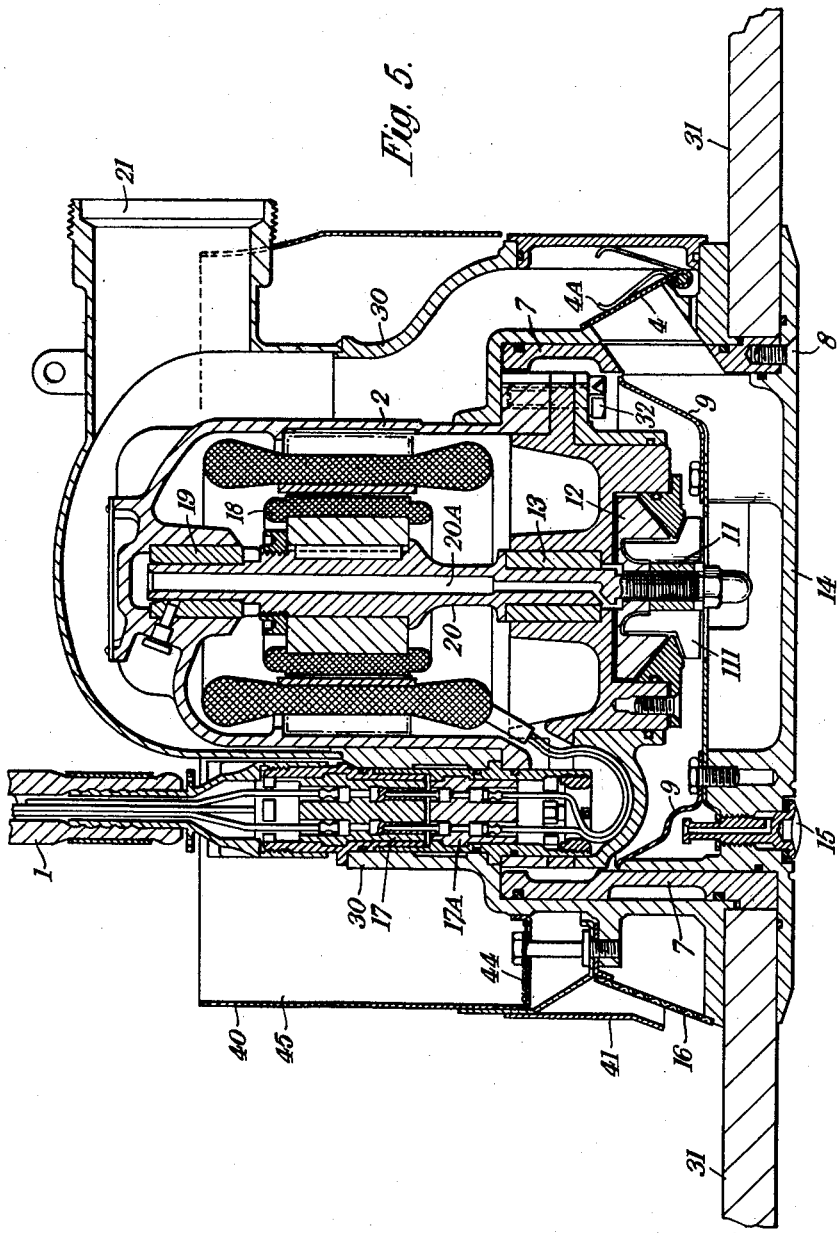

3,163,116
PUMPS

William Donald McCourty, Wolverhampton, Eric Williams, Codsall, and Ivor Byron Cripps, Elston, Wolverhampton, England, assignors to H. M. Hobson Limited, London, England, a company of Great Britain
Filed Aug. 23, 1961, Ser. No. 133,357
2 Claims. (Cl. 103—87)

This invention provides a booster pump for use submerged in fuel in an aircraft fuel tank and including means for pressure lubrication by the fuel of the pump bearings notwithstanding the fact that substantially all the fuel has been pumped from the tank.

The booster pump according to the invention comprises a pump pack including a casing, an impeller external to the casing and carried on a shaft rotatable in bearings in the casing and driven by a motor within the casing, and means for delivering fuel from the impeller to the bearings to provide pressure lubrication of the bearings.

Preferably means are provided whereby the pump and its driving motor can be withdrawn from the tank without draining the fuel from the tank. Provision may also be made for rendering the casing containing the motor explosion proof.

Figure 1:
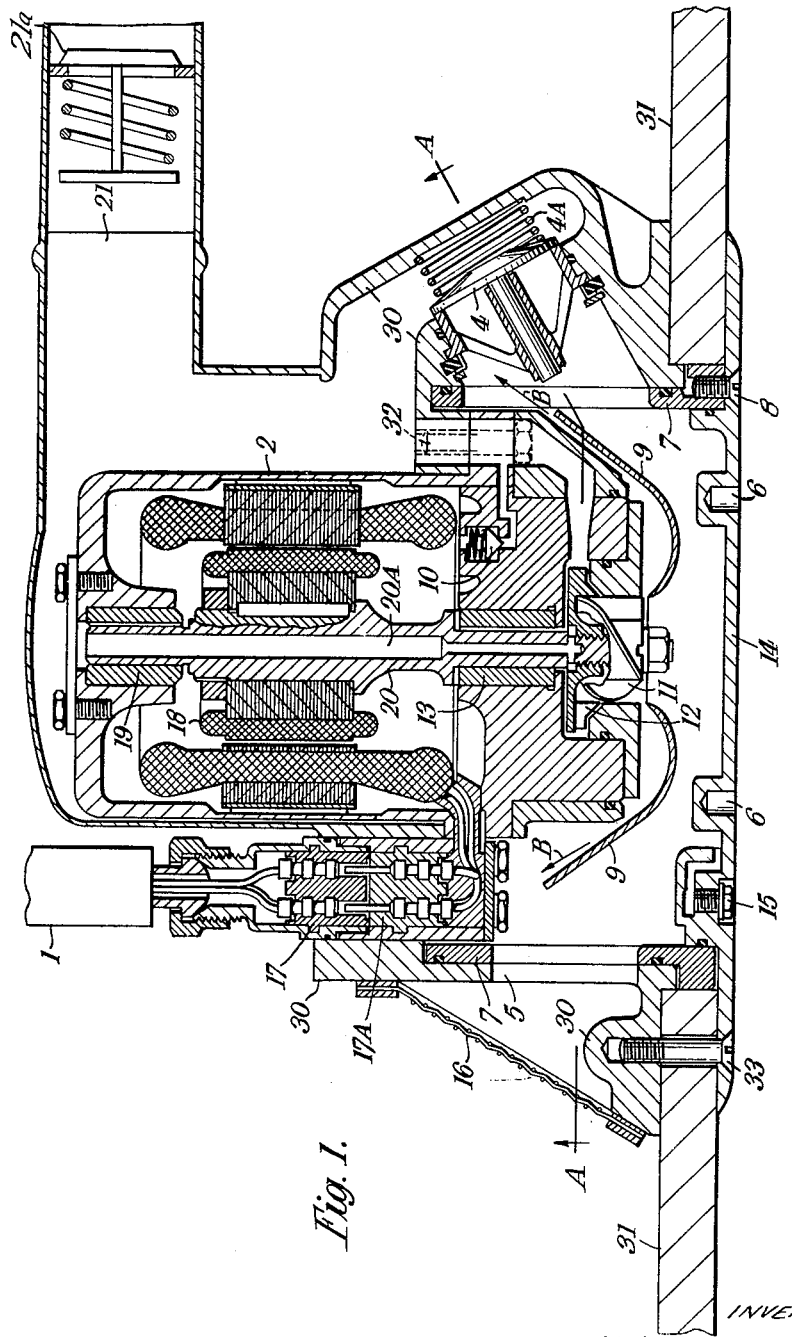
Figure 2:
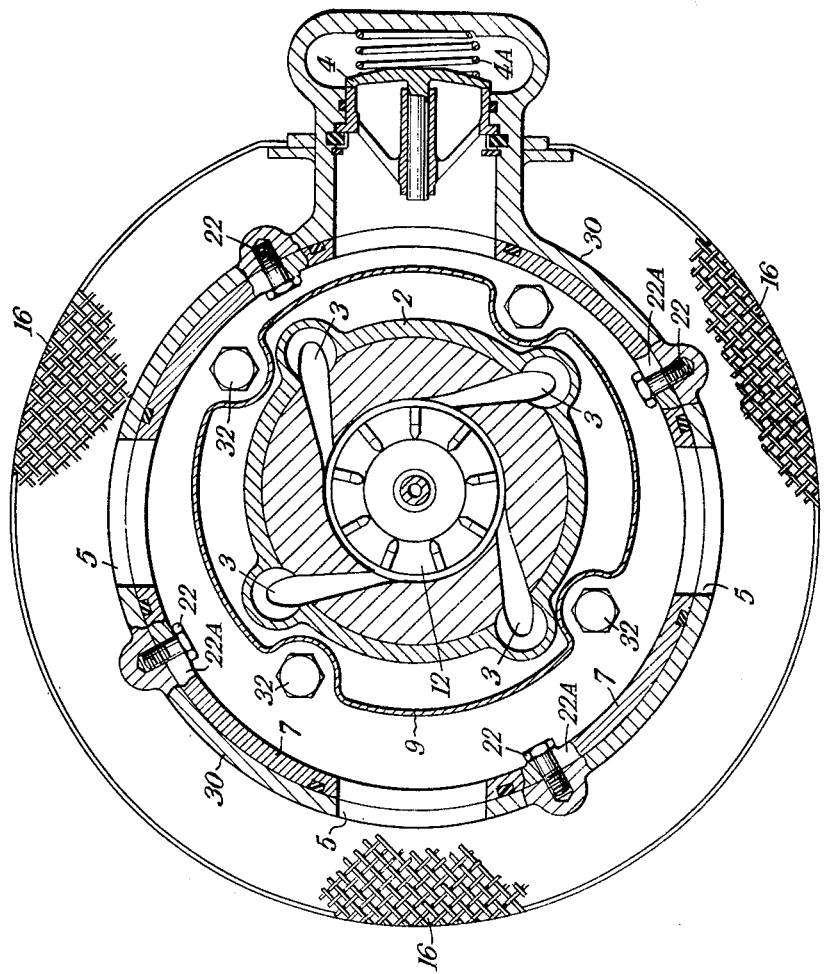
Figure 3:
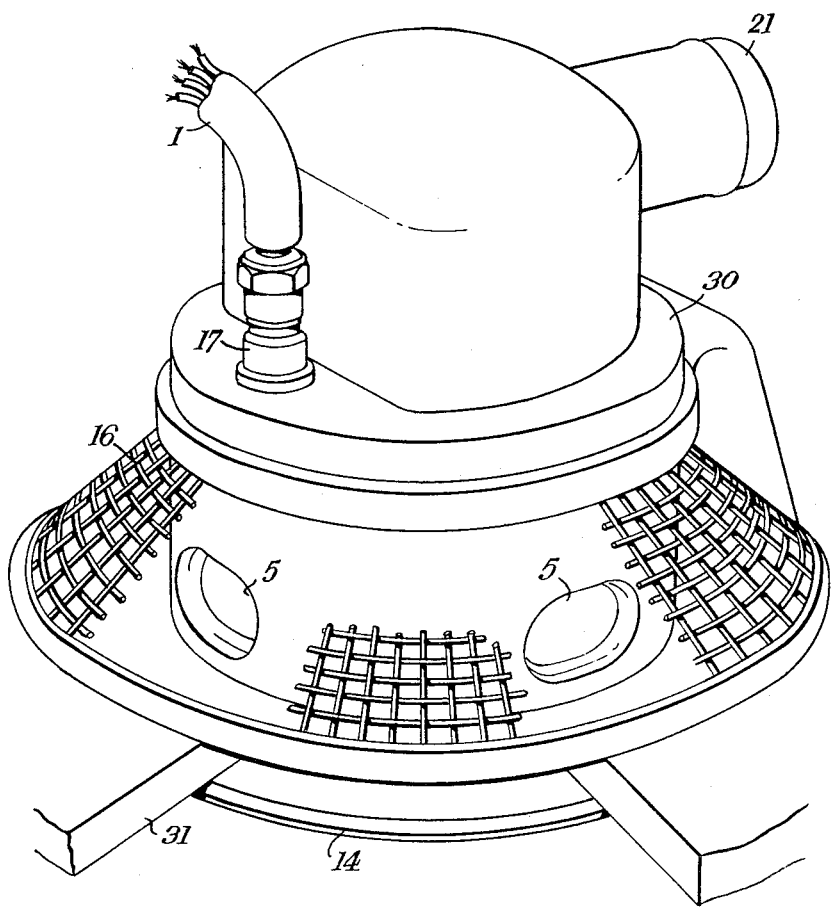

Two embodiments of fuel lubricated booster pump according to the invention will now be described in detail, by way of example, with reference to the accompanying drawings, in which:

FIG. 1 is a vertical section through the first form of pump showing it in position in a fuel tank,
FIG. 2 is a section on the line A—A in FIG. 1,
FIG. 3 is a perspective view of the pump shown in FIG. 1,
FIG. 4 is a side elevation of the second form of pump,
FIG. 5 is a vertical section through the pump shown in FIG. 4, and
FIG. 6 is a sectional view of a detail.

Like reference numerals indicate like parts throughout the figures.

The pump shown in FIGS. 1–3 has an outer casing 30 which is fixed to the bottom 31 of the fuel tank. Within the outer casing 30, and secured thereto by bolts 32, is the inner casing 2 of a pump pack. The casing 2 contains a three phase induction motor 18, for driving the pump shaft 20 which rotates in upper and lower bearings 19, 13. The motor 18 receives current from a fuel tight electrical cable 1 carrying a socket connector 17 which mates with a cooperating plug connector 17A on the casing 2. The shaft 20 carries an impeller 12 and a screw 11. Fixed to the casing 2 beneath the screw 11 is an air scoop 9. When the pump is installed in the tank, as shown, fuel can obtain access to the interior of the pump through a screen 16 and inlet ports 5 controlled by a rotatable sleeve valve 7. The sleeve valve 7 is supported in the outer casing 30 by bolts 22 (FIG. 2) engaging circumferential slots 22A in the valve. When it is desired to withdraw the pump pack 2 from the tank, the valve 7 is rotated to close the inlet ports as described below.

The fuel is discharged by the impeller 12 through tangential diffuser ducts 3 (FIG. 2) to an outlet 21, whence it passes to an engine backing pump via an external check valve 21a (FIG. 1). The air scoop 9 cooperates with the screw 11 to permit air or vapour trapped in the fuel to flow, as indicated by the arrows B to the top of the tank and so free from air the fuel discharged from the outlet 21. A by-pass valve 4 is provided, which is normally closed by a spring 4A. In the event of failure of the booster pump, suction from the engine backing pump will cause the valve 4 to open to permit of flow of fuel to the engine through the valve 4.

Fuel discharged from the impeller 12 can also flow through a check valve 10 into the interior of the pump pack to lubricate the bearings 13, 19. It is able to effect such lubrication as the pressure at the lower end of the lower journal bearing 13 and the upper end of the upper journal bearing 19 will be that at the centre of the impeller 12 whilst the pressure at the upper end of the lower journal bearing 13 and the lower end of the upper journal bearing 19 will be at substantially the pump delivery pressure. The upper end of the upper journal bearing 19 is subject to the pressure at the centre of the impeller 12 via an axial passage 20A in the shaft 20.

The casing 2 of the pump pack is of sufficiently robust construction to withstand the force of an explosion which might occur under circumstances described hereinafter, and the check valve 10 then prevents a flash back from the casing to any fuel remaining in the tank.

The pump pack can readily be withdrawn, as follows, from the tank. Screws 33, attaching to the tank an access cover 14, are first removed. The cover 14 is attached by screws 8 to the sleeve valve 7. After removal of the screws 33, the access cover 14 is rotated by inserting a suitable tool into holes 6 therein so as to close the sleeve valve 7 and isolate the fuel in the tank from the fuel in the pump. The fuel in the pump is then drained by removing a drain plug 15 in the cover 14. The screws 8 are then withdrawn and the cover 14 is removed. After undoing the bolts 32, the casing 2 and its contents can be removed from the tank, the plug fitting 17A becoming detached from the socket fitting 17.

It is necessary for the pump to pump nearly all the fuel from the tank and still remain lubricated and it is able to do this when there is only ¼" of fuel in the bottom of the tank because when, due to presence of air around the screw 11, the pressure at the periphery of the impeller 12 drops slightly, the external check valve 21a will close, but, due to its light loading, the check valve 10 will still allow circulation of fuel to occur through the bearings 13 and 19 and back to the outer casing 30. Under these circumstances, the impeller 12 will act as a rotating seal to prevent liquid seeping from the interior of the casing 2 back to the bottom of the tank. The hazards due to explosion within the casing 2 are not very great so long as the casing is full of fuel. When the pump is inadvertently switched off, fuel within the casing 2 could drain away into the bottom of the tank. The casing 2 would then be partially full of air and vapour which, with the aid of a spark, could result in an explosion within the casing. If the pump should then be inadvertently switched on without the tank being refuelled the bearings 13, 19 might seize up due to lack of lubrication and the resulting mechanical misalignment of the rotor might cause a spark.

Such explosion hazard is avoided by the provision of the check valve 10.

The pump shown in FIGS. 4–6 is in substance the same as that already described with reference to FIGS. 1–3, but it includes two fences 40, 41 surrounding the outer casing 30. The lower fence 41 is imperforate and surrounds the screen 16. It extends nearly to the level of the bottom of the outer casing and its purpose is to enable the pump to continue to operate at a very low level of fuel in the tank and it prevents air contained in the tank from interfering with the pumping action under these conditions. The upper fence 40 enables the pump to operate satisfactorily under conditions in which large amounts of vapour are produced from the fuel.

The screw 11 releases air from the fuel and produces vapour which travels as indicated by the arrow B1 in FIG. 6, through ports 43 in the outer casing 30 and aligned ports 143 in the sleeve valve 7 and a perforated plate 44 into the space 45 between the fence 40 and the outer casing 30. The fence 40 is provided with slots 46 shown in FIG. 4. Without these slots there would be an adverse pressure difference when the level of fuel in the tank is below the top of the fence 40 which would make difficult the release of vapour from the space 45.

The screw 11 utilized in the construction shown in FIGS. 4–6 does not have a continuous blade but carries a plurality of projecting blades 111 arranged to draw fuel inwards toward the centre of the screw and expel fuel at the tips of the blades. The fuel is discharged by the screw to a location such that vapour in the fuel is not drawn back to the inlet of the pump.

It is to be noted that in both constructions illustrated the cooperating plug and socket connectors 17A, 17 are situated below the fuel outlet 21. This eliminates any risk of explosion of fuel in the tank in the event of a spark occurring when these connectors are connected or disconnected.

If desired, the lower end of the fence 41 can be flared at a greater angle than that shown in FIGS. 4–6 and extend to a lower level.

What we claim as our invention and desire to secure by Letters Patent is:

1. A booster pump adapted to be submerged in the liquid which is to be pumped thereby, comprising, an impeller, an elongated hollow shaft fixed to said impeller and having a hollow interior communicating with a central portion of said impeller, said elongated hollow shaft having an open end distant from said impeller, a pair of bearings supporting said shaft for rotation and respectively located adjacent ends thereof, the bearing which is nearest to said impeller also communicating with said central portion of said impeller and the bearing which is distant from said impeller communicating with the open end of said shaft which is distant from said impeller, said shaft being hollow along its entire length and the ends of said bearings which are most distant from each other communicating with each other through said shaft and also communicating with the central portion of the impeller, a casing carrying said bearings and having an interior communicating with the ends of said bearings which are nearest to each other and which are directed toward the interior of said casing, discharge passage means communicating with said impeller to receive liquid therefrom, and a conduit passing through said casing from said discharge passage means to the interior of said casing, whereby the interior of said casing and thus the ends of said bearings which are nearest to each other are at the pressure of the liquid which is pumped by said impeller while the ends of said bearings which are most distant from each other are at the pressure of the central portion of said impeller so that the liquid delivered by said impeller to said discharge passage means will flow in part through said conduit into said casing to fill the latter and be forced through said bearings, from the ends thereof which are nearest to each other to the ends thereof which are most distant from each other, along the hollow interior of said shaft from the bearing which is most distant from said impeller and directly from the bearing which is nearest to said impeller to the central portion of said impeller to again be pumped thereby into said discharge passage means, so that even after the liquid level is so low that the impeller stops pumping liquid beyond said discharge passage means, liquid will nevertheless be continuously circulated from said impeller into said discharge passage means and from the latter through said conduit into said casing and through said bearings back to said impeller, as long as the pump continues to operate, a check valve located in said conduit to prevent liquid from flowing from the interior of said casing back through said conduit to said discharge passage means, and a second check valve in said discharge passage means to prevent liquid at less than a given pressure from passing through said second check valve along said discharge passage means beyond the location of said second check valve.

2. A pump as recited in claim 1 and wherein said first-mentioned check valve is weaker than said second check valve and yields to liquid at less than said given pressure, so that liquid will continue to circulate through said casing after the pressure is too small to open said second check valve and continue the flow of liquid through said discharge passage means.

References Cited by the Examiner
UNITED STATES PATENTS

| | | | |
|---|---|---|---|
| 1,743,048 | 1/30 | Sleaster | 230—114 |
| 2,186,988 | 1/40 | Osborne | 230—114 |
| 2,480,435 | 8/49 | Aspelin | 103—87 |
| 2,741,990 | 4/56 | White | 103—87 |
| 2,750,894 | 6/56 | Thomas et al. | 103—111 |
| 2,832,292 | 4/58 | Edwards | 103—87 |
| 2,865,539 | 12/58 | Edwards | 103—87 |
| 2,872,084 | 2/59 | Edwards | 103—87 |
| 2,961,130 | 11/60 | Adams | 103—87 |

References Cited by the Applicant
UNITED STATES PATENTS

| | | |
|---|---|---|
| 2,669,187 | 2/54 | Guyer. |
| 3,031,973 | 5/62 | Kramer. |

LAURENCE V. EFNER, *Primary Examiner.*

JOSEPH H. BRANSON, *Examiner.*